(12) United States Patent
Thomas

(10) Patent No.: US 9,135,281 B2
(45) Date of Patent: *Sep. 15, 2015

(54) MANAGING MEDIA FILES USING METADATA INJECTION

(71) Applicant: BlackBerry Limited, Waterloo (CA)

(72) Inventor: Edward Eric Thomas, Kanata (CA)

(73) Assignee: BlackBerry Limited, Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,740

(22) Filed: Oct. 9, 2013

(65) Prior Publication Data

US 2014/0040216 A1    Feb. 6, 2014

Related U.S. Application Data

(63) Continuation of application No. 13/335,839, filed on Dec. 22, 2011, now Pat. No. 8,572,135, which is a continuation of application No. 12/177,105, filed on Jul. 21, 2008, now Pat. No. 8,086,651.

(60) Provisional application No. 61/127,796, filed on May 14, 2008, provisional application No. 61/127,813, filed on May 14, 2008, provisional application No. 61/052,633, filed on May 12, 2008, provisional application No. 61/052,640, filed on May 12, 2008.

(51) Int. Cl.
  *G06F 17/30* (2006.01)
(52) U.S. Cl.
  CPC .... *G06F 17/30289* (2013.01); *G06F 17/30017* (2013.01); *G06F 17/30038* (2013.01)

(58) Field of Classification Search
  CPC ............... G06F 17/30289; G06F 17/30038; G06F 17/30017
  USPC ............ 707/822, 823, 826, 622; 84/601, 812; 715/716, 733, 737, 748, 751
  See application file for complete search history.

(56) References Cited

U.S. PATENT DOCUMENTS

| | | |
|---|---|---|
| 5,713,013 A | 1/1998 | Black |
| 6,072,479 A | 6/2000 | Ogawa |
| 6,295,541 B1 | 9/2001 | Bodnar et al. |
| 6,549,922 B1 | 4/2003 | Srivastava et al. |
| 6,744,815 B1 | 6/2004 | Sackstein |
| 7,260,312 B2 | 8/2007 | Srinivasan |
| 7,346,687 B2 | 3/2008 | Lipscomb |

(Continued)

FOREIGN PATENT DOCUMENTS

| | | |
|---|---|---|
| EP | 1227396 | 7/2002 |
| EP | 1632945 | 3/2006 |

(Continued)

OTHER PUBLICATIONS

Devulapalli et al., File Creation Strategies in a Distributed Metadata File System, 2007, IEEE, 10 pages.*

(Continued)

*Primary Examiner* — Jean B Fleurantin
(74) *Attorney, Agent, or Firm* — Fish & Richardson P.C.

(57) ABSTRACT

Apparatus and methods to manage media files using metadata injection provide a mechanism to enhance user interaction with multimedia devices. Additional apparatus, systems, and methods are disclosed.

13 Claims, 10 Drawing Sheets

(56) References Cited

U.S. PATENT DOCUMENTS

| | | |
|---|---|---|
| 7,680,849 B2 | 3/2010 | Heller et al. |
| 8,005,789 B2 | 8/2011 | Yoon et al. |
| 2002/0099737 A1 | 7/2002 | Porter et al. |
| 2002/0103919 A1 | 8/2002 | Hannaway |
| 2002/0124099 A1 | 9/2002 | Srinivasan |
| 2002/0147850 A1 | 10/2002 | Richards et al. |
| 2002/0148343 A1* | 10/2002 | Gross .................. 84/609 |
| 2003/0236695 A1 | 12/2003 | Litwin |
| 2004/0034650 A1 | 2/2004 | Springer |
| 2004/0103174 A1 | 5/2004 | Balducci et al. |
| 2004/0126038 A1 | 7/2004 | Aublant et al. |
| 2004/0205638 A1 | 10/2004 | Thomas |
| 2004/0267825 A1 | 12/2004 | Novak et al. |
| 2005/0010616 A1 | 1/2005 | Burks et al. |
| 2005/0015551 A1 | 1/2005 | Eames et al. |
| 2005/0021470 A1 | 1/2005 | Martin et al. |
| 2005/0131959 A1 | 6/2005 | Thorman et al. |
| 2005/0165752 A1 | 7/2005 | Mathew et al. |
| 2005/0210119 A1 | 9/2005 | Kumar |
| 2006/0004699 A1 | 1/2006 | Lehikoinen |
| 2006/0020589 A1 | 1/2006 | Wu et al. |
| 2006/0069998 A1 | 3/2006 | Artman et al. |
| 2006/0100978 A1 | 5/2006 | Heller et al. |
| 2006/0163358 A1 | 7/2006 | Biderman |
| 2006/0188215 A1 | 8/2006 | Matsutani |
| 2006/0204211 A1 | 9/2006 | Morohoshi et al. |
| 2006/0242259 A1* | 10/2006 | Vallabh et al. .......... 709/217 |
| 2007/0005653 A1 | 1/2007 | Marsh |
| 2007/0038941 A1 | 2/2007 | Wysocki et al. |
| 2007/0043765 A1 | 2/2007 | Chan et al. |
| 2007/0050366 A1 | 3/2007 | Bugir et al. |
| 2007/0112844 A1 | 5/2007 | Tribble et al. |
| 2007/0112861 A1 | 5/2007 | Buczek et al. |
| 2007/0198602 A1 | 8/2007 | Ngo et al. |
| 2007/0233702 A1 | 10/2007 | Ohkita et al. |
| 2007/0271310 A1 | 11/2007 | Han et al. |
| 2008/0109449 A1 | 5/2008 | Chun et al. |
| 2008/0194276 A1 | 8/2008 | Lin et al. |
| 2009/0150569 A1 | 6/2009 | Kumar et al. |
| 2009/0282020 A1 | 11/2009 | McSheffrey et al. |
| 2009/0282050 A1 | 11/2009 | Thomas |
| 2009/0282057 A1 | 11/2009 | Thomas |
| 2009/0282077 A1 | 11/2009 | Thomas |
| 2009/0282078 A1 | 11/2009 | Thomas et al. |

FOREIGN PATENT DOCUMENTS

| | | |
|---|---|---|
| EP | 1708101 | 10/2006 |
| EP | 1923797 | 5/2008 |
| JP | 0241823 | 2/2002 |
| JP | 02182658 | 6/2002 |
| JP | 200665813 | 3/2006 |
| JP | 200680965 | 3/2006 |
| JP | 2008052520 | 3/2008 |
| JP | 2008538843 | 11/2008 |
| WO | 0063801 | 10/2000 |
| WO | 02075539 | 9/2002 |
| WO | 03036541 | 5/2003 |
| WO | 2005116868 | 12/2005 |
| WO | 2006116368 | 2/2006 |
| WO | 2008008448 | 1/2007 |
| WO | 2007145854 | 12/2007 |

OTHER PUBLICATIONS

Ananth Devulapalli et al, "File Creation Strategies in a Distributed Metadata File System", 2007, IEEE, 10 pages.

"European Application Serial No. 09160028.8", Search Report, Jul. 27, 2009, 7 pages.

"European Application Serial No. 09160031.2", Extended European Search Report, Jul. 17, 2009, 7 pages.

"European Application Serial No. 09160035.3", Search Report, Oct. 12, 2009, 9 pages.

Peery, et al., "Wayfinder: Navigating and Sharing Information in Decentralized World", Lecture Notes in Computer Science, Databases, Information Systems, and Peer-to-Peer Computing, vol. 3367/2005, 2005, 208-212.

Satyanarayanan, et al., "A Highly Available File System for a Distributed Workstation Environment", IEEE, 1990, 447-459.

Sinitsyn, et al., "A Synchronization Framework for personal mobile server", Proceeding of the Second IEEE Annual Conference on Pervasive Computing and Communications Workshops, PERCOMW'04, Mar. 14, 2004, 208-212.

Taku, et al., "Content Protection in Content Delivery for Adaptive Content", The IEICE Transactions on Communications (JP Edition), No. 3, vol. J89-B, Mar. 2009, 324-336.

Vetro, et al., "Media Conversions to Support Mobile Users", Electrical ad Computer Engineering, Canadian Conference, 2001, 607-612.

Office Action issued by the Canadian Intellectual Property Office on Dec. 18, 2013 (2 pages).

* cited by examiner

MANAGING MEDIA FILES USING METADATA INJECTION

RELATED APPLICATION(S)

Cross-Reference to Related Application

This application is a continuation of U.S. application Ser. No. 13/335,839, filed Dec. 22, 2011 and issued as U.S. Pat. No. 8,572,135, which is a continuation of U.S. application Ser. No. 12/177,105, filed Jul. 21, 2008 and issued as U.S. Pat. No. 8,086,651 on Dec. 27, 2011, which claims the benefit of priority under 35 U.S.C. 119(e) to U.S. Provisional Application Ser. No. 61/127,796 filed 14 May 2008, to U.S. Provisional Application Ser. No. 61/127,813 filed 14 May 2008, to U.S. Provisional Application Ser. No. 61/052,640 filed 12 May 2008, and to U.S. Provisional Application Ser. No. 61/052,633 filed 12 May 2008, which are incorporated herein by reference in their entirety.

BACKGROUND

Access to information is an important factor in the activities of individuals in modern society. Improvements to the flow of information enhance one's ability to interact with others, to respond to changing needs, and to avail oneself of enjoyment from processing various media based information.

SUMMARY OF THE INVENTION

Apparatus and methods to manage media files using metadata injection provide a mechanism to enhance user interaction with multimedia devices.

BRIEF DESCRIPTION OF THE DRAWINGS

Embodiments of the invention are illustrated by way of example and not limitation in the figures of the accompanying drawings in which.

DETAILED DESCRIPTION

Figure 1:
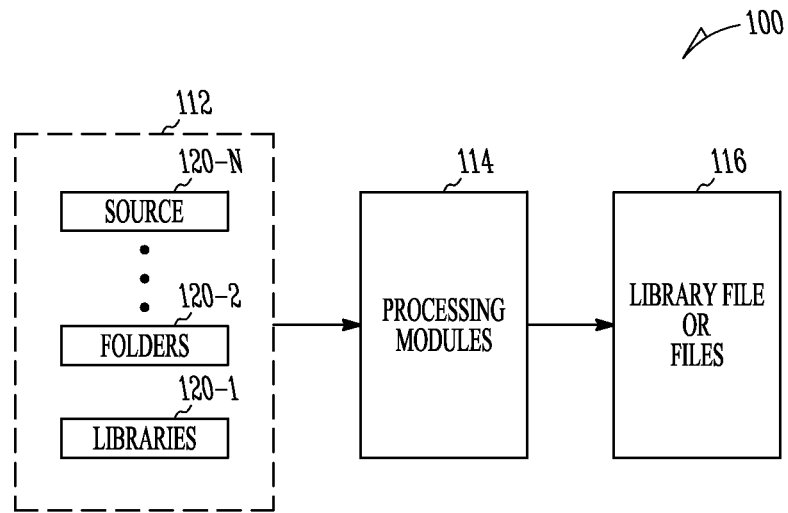
FIG. 1 is a functional block diagram of system for managing media content, according to various embodiments.

The following detailed description refers to the accompanying drawings that show, by way of illustration, details and embodiments in which the invention may be practiced. These embodiments are described in sufficient detail to enable those skilled in the art to practice embodiments of the present invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

In various embodiments, media content is managed in a system. Systems and methods for managing media content may be configured such that the management may be conducted with limited user interaction and, in various embodiments, the system may perform essentially autonomously. Media is a form of general communication, information, or entertainment, which is typically intended to be used by a large audience, though not limited to a large audience. Various media may include, but are not limited to, music, movies, music videos, television shows, interactive applications, audiobooks, podcasts, games, personal presentation, and other presentations. Each form of media may be referred to as media content or media art. An individual item of such media may be referred to as media content or media art. Media content may include content in any media format. Some examples of content may include, but are not limited to, audio files, video files, image files, and multimedia files. Audio file formats may include, but are not limited to, MP3, AIFF, WAV, MPEG-4, AAC, and Apple Lossless. Other example the formats for media content include, but are not limited to, files having extensions doc, dot, wpd, txt, xis, pdf, ppt, jpg, jpeg, png, bmp, gif, html, htm, zip, tif, tiff, and wmf. Associated with an item of media art that is stored or processed on an apparatus is a media file, which when operated on by an associated playing device (player) provides an output that can be presented as communication, information, entertainment, other presentations, or combinations thereof for the user.

Systems that manage media content may include various apparatus such as computer systems or other systems having hardware, software, and/or hardware and software to manage media content. In various embodiments, a personal computer (PC) can be used to manage media content and associated media files. A personal computer, as is generally known, herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers. An example of a portable PC is a laptop computer or notebook computer that typically has a display screen, keyboard, underlying hardware and software, and a display pointing device that are all integrated in a housing that can easily be carried by an individual. Some personal digital assistants (PDAs) may be viewed as a type of portable computer. In various embodiments, a PC may include instrumentality for managing media content and instrumentality to operate as a wireless server. A wireless server is a server configuration that communicates with an entity over a channel established by the entities in a wireless network.

Various instrumentalities can be realized in hardware implementations, software implementations, and combinations of hardware and software implementations. Some portions of the instrumentalities may be described in terms of algorithms and symbolic representations of operations on data bits within a machine memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. The instrumentality may operate to process, compute, calculate, determine, display, and/or conduct other activities correlated to processes of a machine such as a computer system, or similar electronic computing device, that manipulates and transforms data represented as physical (electronic) quantities within the computer system's registers and memories into other data similarly represented as physical quantities within the computer system memories or registers or other such information storage, transmission or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

In various embodiments, a PC manages media content in relationship to one or more mobile devices. Each mobile device can play media files and can interact with the PC with respect to the management of media content on the respective mobile device. In various embodiments, the mobile devices include instrumentalities similar to those of the PC to manage the media content on the mobile device, to browse media files in one or more PCs, and to engage with a PC in interactive management of media content on the mobile device, on the PC, and on other mobile devices in which the media content may be shared. Other apparatus configured with hardware, software, and/or hardware and software to function in a similar manner as the PC to manage media content may be used in conjunction with the mobile devices. The mobile devices may be mobile wireless communications devices. The mobile wireless communications devices may include, but are not limited to, mobile telephones, portable computers, PDAs, and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer.

In an embodiment, a system organizes information associated with media content from multiple media sources into a single unified library file. The information may be organized as indexed information. Managing media content is not limited to a single library file. In various embodiments, more than one library file may be utilized. Access to a library file can be provided to a number of mobile devices. The access may be provided as full access or limited access. For example, access to a library file by a mobile device may be limited to a mobile device based on whether the mobile device has one or more media players to operate on the media content. Other criteria may be used to limit access to a mobile device. In various embodiments, the library file is maintained on the system and is accessed from the mobile device remotely. In various embodiments, a library file or a modified version of a library file can be transferred to the mobile device and the mobile device can access the library file locally. The library file can be used by the mobile device to transfer media content from one or more media sources to the mobile device. The mobile device may have wireless capabilities. The mobile device may be a mobile wireless communication device.

FIG. 1 is a functional block diagram of system 100 for managing media content. System 100 includes inputs 112, processing modules 114, and outputs 116. Inputs 112 include one or more media sources 120 of media content (also herein referred to as "media sources," "media source," "sources," or "source"). Media content may include content in any media format. Some examples of content may include, but are not limited to, audio files, video files, image files, and multimedia files. Audio file formats may include, but are not limited to, MP3, AIFF, WAV, MPEG-4, AAC, and Apple Lossless. Other example file formats for media content include, but are not limited to, files having extensions doc, dot, wpd, txt, xls, pdf, ppt, jpg, jpeg, png, bmp, gif, html, htm, zip, tif, tiff, and wmf.

Media sources 112 may include media libraries 120-1 for media players such as, but not limited to, libraries for iTunes® audio players, Windows Media Player® (WMP), RealPlayer®, and other players. Each library may include collections of various media content. A collection is a subset of the files in a library. The collections may include references to the files. Each collection may refer to anywhere from zero files to all of the files in the library. An example of a collection of a music library is a playlist. In various embodiments, sources 112 of media content may be files within one or more folders 120-2 on a single computer system or on multiple computer systems.

Processing modules 114 include software and/or hardware to transfer media content from media sources to devices that use the associated media. Processing modules include instrumentality to operate as a "connector," which means that the processing modules interface with media sources to collect information associated with a media file configured to operate with a specific media player. Processing modules may be arranged with a set of connectors, one for each type of media player incorporated in system 100 or used by mobile devices whose media content is managed by system 100. Processing modules 114 may include connectors to interact with mobile wireless communication devices, where the mobile wireless communication devices are a source of media content. Processing modules 114 may use, but are not limited to, a Windows COM interface or a XML file when connecting to various media sources. In addition, processing modules 114 may create a representation (for example, a library or libraries of information regarding the media content) of the media content available from multiple media sources. In various embodiments, media content may include information with respect to another media file that is played by a media player. For instance, a jpeg (Joint Photographic Experts Group) file may be a file of album art for songs on an album, where the media files of the songs are played on a media player.

In various embodiments, output 116 from processing modules 114 is a representation created by processing modules 114. The representation may also be maintained by processing modules 114. Output 116 may include device specific data for a mobile wireless communication device or a media player. Output 116 may comprise metadata, such as metadata based on user preferences or device settings. Generally, metadata is information about data. Various media content may be metadata with respect to other media content. For example, a file having a jpg file format may provide information regarding an audio file having a mp3 file format such that the jpg file is metadata for the mp3 file.

In an example embodiment, the representation may be any means for identifying the content of the media source files. In some embodiments, a library file 116 created by processing modules 114 contains metadata for the media content available in the one or more media sources 120-1 . . . 120-N, but omits the actual media content. Library file 116 may be organized using a standard format that represents the information contained in the media sources. In various embodiments, the standard format is a compressed format and/or a format that is substantially smaller than the media library itself. For example, a media library with 30 GB of audio files may be presented by processing modules 114 in a file that may be 200 KB.

In operation, system 100 for managing media content shown in FIG. 1 creates a representation of the media content available in one or more media sources 120-1 . . . 120-N and provides a means for accessing the media content by any device with a media player including a mobile wireless communications device. The device may browse the representation and may select individual media content items to copy or transfer from the media source to the device. After selection, all or a portion of the media content item may be transferred to the device and may be played on a media player on the device. In various embodiments, system 100 brings content from multiple media sources into a single unified library 116 and pushes out device specific metadata from the single library to the specific device.

Figure 2:
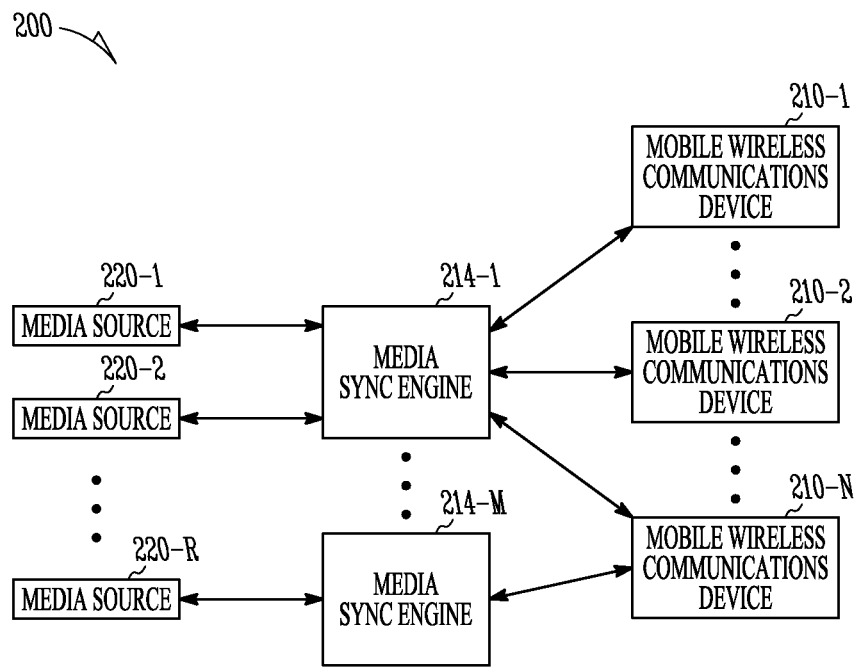
FIG. 2 shows a block diagram of an architecture for transferring media content between media synchronization engines of a system and mobile wireless communications devices, according to various embodiments.

FIG. 2 is a block diagram of an architecture for transferring media content between media synchronization engines 214-1 . . . 214-M of a system 200 and mobile wireless communications devices 210-1 . . . 210-N. The media content can be provided from media sources 220-1 . . . 220-R. Media sources 220-1 . . . 220-R can reside on system 200. The media content in media sources 220-1 . . . 220-R may be provided from various sources external to system 200. For instance, media sources 220-1 . . . 220-R can be media libraries resident on system 200 that are created as libraries to store media files provided by media stores accessed on the Internet. Media sources 220-1 . . . 220-R may contain media files loaded in the system by a user from a portable storage medium such as, but not limited to, a CD or a DVD. Mobile wireless communications devices 210-1 . . . 210-N may also be media sources. Media synchronization engines 214-1 . . . 214-M (also referred to as a media sync engines or a media sync applications) that operate in the transferal of a media file may also operate to manage a media library and a metadata library file associated with the media file. The media file can be operated on by a media player to provide the media content for visual and/or audio presentation to a user of system 200 or one or more of mobile wireless communications devices 210-1 . . . 210-N.

Media sync engines 214-1 . . . 214-M can create representations (such as a library file or files) identifying media content available from multiple media sources and provide data from the library to mobile wireless communications devices 210-1 . . . 210-N. In an embodiment, a media sync engine is an example of the processing modules shown in FIG. 1. In various embodiments, a media sync engine provides a method to synchronize a media library such as an iTunes® digital music library with a smartphone such as a BlackBerry brand smart phone. The files may be transferred using a wireless connection or a wired connection such as a high speed USB 2.0 connection.

Mobile wireless communications devices 210 may include, but are not limited to, mobile telephones, portable computers, personal digital assistants (PDAs), media players and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer. Multiple devices of different types/capabilities may transfer media content using one or more media sync engines.

Figure 3:
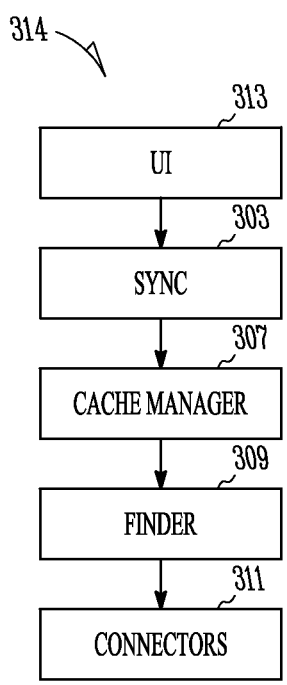
FIG. 3 illustrates a block diagram of a processing module that provides functionality similar to that of the processing modules shown in FIG. 1, according to various embodiments.

FIG. 3 illustrates a block diagram of a processing module 314 that provides at least the functionality of the processing modules shown in FIG. 1 according to an example embodiment. Processing module 314 may reside on a PC that interacts with one or more mobile devices. Processing module 314 includes a sync module 303, a cache manager 307, a finder 309, and one or more connectors 311. Sync module 303 includes instrumentality to conduct synchronization operations with the mobile devices, where the operations include adding media files to and removing media files from the mobile devices. Sync module 303 can interact with a mobile device to determine its identity and acquire information on the availability of allocated media storage on the mobile device. Sync module 303 is configured to operate with a user interface (UI) 313 of the PC.

Connectors 311 identify specific instances of a particular type of library on the PC or mobile device. In other words, connectors 311 perform a discovery function that finds individual libraries. A connector for a particular library is capable of communicating with a particular library or file using a corresponding application programming interface (API), protocols, file formats, etc. When an individual library is discovered, the connector can retrieve media collections from that instance of the individual library. Connectors 311 may include an iTunes connector, a WMP connector, a RealPlayer connector, and various other connectors correlated to instrumentality for operating on the respective media files to provide a presentation to the PC user. An individual connector may be configured as a combination of a read only connector and a writeable connector. A writeable connector may perform such activities as adding a user-assigned rating for a song, creating a playlist, editing a playlist, deleting a song, etc.

Finder 309 provides a discovery mechanism for connectors. Finder 309 may identify what connectors 311 are available for processing. The available connectors may register with finder 309. If a separate connector is used for each type of library, the particular connectors that are discovered by finder 309 can determine what type of libraries are in the system in which processing modules 314 operate.

Cache manager 307 may also determine which of the available connector(s) to use. For example, if a collection of media content may be accessed either by using iTunes software or through an iTunes xml file, cache manager 307 can determine whether to use the iTunes application connector or the iTunes xml file connector in order to access the iTunes collection. Cache manager 307 may provide a unified interface to multiple sources/libraries. Cache manager may maintain a buffer that unifies files from different libraries. For example, if the same music track is present in multiple libraries (e.g., in a user's iTunes library and in the user's Windows Media Player library), the cache manager may maintain a single buffer that is an aggregation of the tracks from the different libraries. Alternatively, cache manager 307 may maintain a separate buffer for each of the different libraries. Cache manager 307 may implement the buffer using any form of data storage. In various embodiments, the data storage may either be persistent or non-persistent.

In various embodiments, cache manager 307 may implement connector watchers. A connector watcher monitors one or more collections and determines when a collection has changed. For example, if an iTunes xml file changes or if the iTunes library has been updated, cache manager 307, which monitors that particular collection, detects the update and reads the changes into an appropriate buffer. Cache manager 307 may also determine when to update the device library.

Embodiments, as illustrated in FIGS. 1-3, and similar embodiments may be implemented as a desktop application to transfer media content from multiple sources to a mobile wireless device. The desktop application for managing media content may be launched on a PC. The desktop application may be automatically launched on startup of the PC. The desktop application may be launched on detection of a device connection to the PC. In various embodiments, a user may launch the desktop application. Alternatively, embodiments, as illustrated in FIGS. 1-3, and similar embodiments may be implemented to allow a mobile wireless device to update content already present on the mobile wireless device with media content from multiple sources.

In various embodiments, a system managing media content can be structured to provide a number of different features. Content from multiple media sources may be entered into a single unified library and device specific metadata pushed out from the single library. A library file in a format to provide a compact representation of media metadata may be generated as output of processing modules, similar to processing modules discussed with respect to FIGS. 1-3. Varying schema can be used for choices to select, group, and rearrange data in the representation in the file format. Various features of a managing system may include maintaining representations of original source identifications so that an identifier such as an ID, a path, etc. may be used to track/manage information regarding different multiple sources of substantially the same media content. Various features of a managing system may include injecting or modifying metadata for a media file during transfer to a device. Examples of injected metadata may include album art, volume settings and other device settings, user preferences, and other parameters.

Management of media content on a mobile device may be realized through interaction with a media sync engine of one or more apparatus, such as multiple PCs. The mobile device, such as a mobile wireless communication device, through such interaction acquires information regarding the availability of media files on each PC and an identity of the PC that was the source of media content existing on the mobile device.

Various features of the managing system may include a simplified user interface (UI) on the PC for transferring information to the mobile device and representing information that is present on the mobile device. The UI may generate representations to provide criteria for handling user selection of media content that exceeds device capacity. In various embodiments, applications in the PC may use the information in the library of the PC to autonomously handle user selection of media content that exceeds device capacity. The UI can provide an automatic fill function for a user to select such that the PC automatically handles selection of media content to transfer to the mobile device. In the various embodiments, a mobile device may be a mobile wireless communication device. A mobile wireless communication device may include instrumentality to manage media content in substantially the same manner as a PC.

Figure 4:
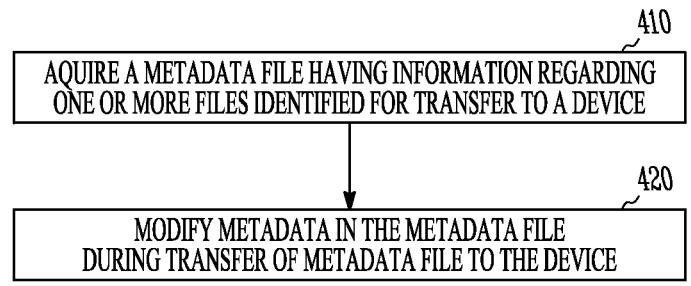
FIG. 4 illustrates features of a method that includes injecting metadata as files are transferred from one apparatus to another apparatus.

FIG. 4 illustrates features of a method that includes injecting metadata as files are transferred from one apparatus to another apparatus. At 410, a metadata file having information regarding one or more files identified for transfer to a device is acquired. The metadata file may be transferred in a common transfer process with the media files identified for transfer to the device. The files may be media files such as, but not limited to, video files, audio files, picture files, and multimedia files. The metadata file may be a metadata library file providing substantially all the metadata associated with a given media file. The metadata library file may be configured as a single unified library of metadata for all media files of an apparatus such as a personal computer. Alternatively, the apparatus may have a number of comprehensive metadata library files, one associated with each different media library such as a music library, a video library, a multimedia library, a picture library. In addition, a metadata file may be arranged as a metadata file containing a subset of information of a media library, where the subset of information is determined based on the files identified for transfer to a device. Metadata library files may reside and be used on mobile devices that operate on the files having information in the metadata library. The operation by the device may include playing music, videos, and/or displaying pictures. The mobile devices may have a number of different media players to operate on different media files. These media players may be realized as a combination of hardware and software.

For example, a mobile wireless communication device that plays music may have a metadata file associated with all the music files stored on the device. The mobile wireless communication device that plays music may have a metadata file associated with a playlist of music files stored on the device. The mobile wireless communication device may have a metadata file associated with all the music files stored on a PC that the mobile wireless communication device may access to download music files to the mobile wireless communication device. In addition, the mobile wireless communication device may include multiple media players. The multiple media players may include multiple players for a single type of media such as multiple players that provide music.

At 420, metadata in the metadata file is modified during transfer of the metadata file to the destination, such that the file on the destination is different from the source by having different or additional metadata, without any intermediary or temporary file having been created. In various embodiments, a media metadata file is modified during transfer of the media metadata file to the device. The media metadata file may be a media metadata library file. For all types of media files, metadata may be modified according to injection policy parameters and/or user settings associated with one or more music media files, the device to which files are to be transferred, and/or the user of the device. In various embodiments, a music media file metadata may be modified by injecting album art associated with the music file. In various embodiments, volume settings for a music file may be injected into the metadata library file whereby the volume settings may be different for different music files. In various embodiments, metadata in the metadata library file may be modified by injecting playing limitations or selection likelihoods associated with the music media files, such as but not limited to content based limitations relative to age. In various embodiments, video media files metadata may be modified by injecting viewing limitations associated with the video media files, such as but not limited to content based limitations relative to age. In various embodiments, the metadata of the media files may be modified by injecting artifacts indicative of the source of the transfer.

In various embodiments, injection of metadata into a media metadata file may occur during a transfer of media files from a PC to a wireless communication device during a media synchronization process. The injection of the metadata may include adding new metadata to a metadata file or replacing metadata in a file with other metadata. When replacing the metadata in a file with other metadata, an application running on the PC can make a determination that there is a segment of stored metadata accessible by the PC that is more relevant to the media file being transferred than a corresponding segment currently in the metadata file to be transferred to the wireless communication device. The metadata determined to be more relevant can be placed into the media metadata file with the corresponding segment being removed from the metadata file. In addition, additional metadata can be inserted into the metadata file indicating the source from which the replacing metadata is derived.

In an embodiment, a PC may contain a unified media library. The unified media library includes metadata for many or all media files accessible from one or many sources. The metadata is collected and stored by one or more applications of the PC that monitor and collect metadata as artifacts of activities by media applications that manage the media files. The acquisition and storage of metadata can include activities of the users of the PC, where the activities are related to characteristics of the media files. For example, when a site on the Internet is accessed and music is played in a streaming mode on the PC, the identity of the music, the name of the artist, the length of the music track, the identity of the website may be collected and stored in a storage medium accessible by the PC. If the same music is accessed from the same website, this information can be captured and the two occurrences can be related as being the same music with a high level of confidence. If the same music is accessed from another website, the collected data will be different, but using information that is common to both, the two instances of the music can be identified as being the same with a different level of confidence. In addition, the total information regarding a media file stored by the PC can include different metadata from different sources. For example, with a music file of a song stored in a iTunes® library on the PC and album art for the song provided from a source other than the iTunes® library, the unified media library can include the album art as associated with the song along with the identification of the sources of this metadata. The acquisition, storage, and analysis of metadata is not limited to metadata for music files, but may include video files, multimedia files, pictures files, document files, and other media related files.

In various embodiments, one or more media files managed by a PC are to be transferred to a mobile device, such as but not limited to, a mobile wireless communication device. The initiation of the transfer may be generated using various mechanisms. A user at a user interface of the PC may select transfer of the files. The transfer can begin directly from the user selecting a download activity of the media file or a sync activity to synchronize a set of media files on the PC as media files on the wireless communication device. The transfer can begin sometime after the user selection, based on such factors as a determination by an application of the PC that the wireless communication device has capacity to receive the media files, determination by an application of the PC has there is a communication path to the wireless communication device that has capacity to transfer the media files, and/or a determination by an application of the PC has there is no other restriction on transferring the media files from the PC to the wireless communication device. Other criteria may be used to transfer the files.

In addition, a user of the mobile device may desire to browse through a list of media files to play on the user's mobile device, With the mobile device having a screen display, information about the media files on the mobile device can be presented to the user on the screen display in various formats. The displayed information regarding media files on the mobile device or accessible to the mobile device may include, for each media file, the name of the media art, the artist, a time length associated with the media art, artwork work associated with the media art. For a selection of music media, the displayed information can include, without limitation, the name of a song, the person or group performing the song, the track length for playing the song, album art of an album in which the song is a part of the album. For a selection of video media, the displayed information can include, without limitation, the name of a movie, primary individuals performing in the movie, the track length for playing the movie, marquee art associated with advertising the movie. Other media, which can be played on the mobile device with characteristic information regarding a selected media or selection of media presented on the screen display, include, but are not limited to, music videos, television shows, user interactive applications, audio books, podcasts, games, and other media presentations. The information can include data for applications on the mobile device to manage media files on the mobile device, to manage media sync with a PC, and/or to manage acquisition of media files from other sources external to the mobile device. The information can be stored in the mobile device as metadata associated with the media files in a variety of formats for management by applications on the mobile device.

Figure 5:
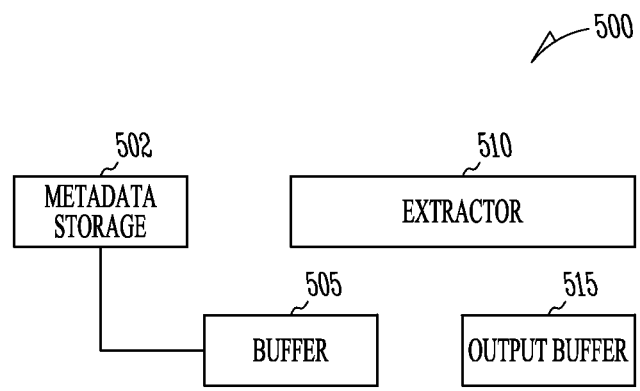
FIG. 5 illustrates an example of a stream builder to modify a metadata file for transfer, according to various embodiments.

FIG. 5 illustrates an example of a stream builder 500 to modify a metadata file for transfer, according to various embodiments. In transferring a metadata file associated with media files, the PC transfers the file in a format that can be used by the mobile device receiving the file. A PC may contain instrumentality to generate multiple different formats to satisfy transfer protocols with different mobile devices. The instrumentality includes the rules for formatting the information that can be read by the mobile device. Upon selection of a media file for transfer, a path to a metadata storage location is determined corresponding to the selected media file. The metadata in the metadata storage 502 is output to a buffer 505 according to the file format corresponding to the rules for transferring a media file and associated metadata to the specified mobile device. The mobile device can be specified in the establishment of a communication link between the PC and the mobile device and/or the mobile device can be specified in the activities of a user on the PC that can be used for media sync.

An extractor 510, which reads the information in buffer 505 in equivalently the same manner as an application on the specified mobile device that reads the metadata, writes the desired metadata in output buffer 515 to be transferred to the specified mobile device. During writing to output buffer 515, metadata can be injected into the metadata file to be transferred to the specified mobile device. Various mechanisms may be used to inject metadata to alter the data in buffer 505 to realize the data in output buffer 515. For example, extractor 510 may perform the data injection as data flows from buffer 505 to output buffer 515. Data injection may include no modification by extractor 510. The definition of the stream builder can be done without loading the streams into a buffer and can combine source information from various buffers in memory, files, and network streams. In various embodiments, the transfer of the streams is batched over several stream builders allowing use of shared buffer resources and scheduling of IO operations for efficient usage of computing resources such as transfer bandwidth, CPU time, threads and persistent disk space.

If selection of media art, such as a song, is from a media library that does not include all the information that is anticipated by the receiving mobile device, extractor 510 can inject information in accordance with the file transfer rules. If the missing information is in another media library or is associated with a source other than the source providing the media file, extractor 510 can inject the metadata. For example, if a selected song is in an iTunes® library on the PC without associated album artwork, extractor 510 can inject the album artwork, such as a jpeg file, that is stored in the PC associated with the song in a WMP® library. Injection of the album artwork from a different source may be based on confidence levels that the selected song is substantially the same and that the selected album artwork corresponds to the selected song. Alternatively, an application on the PC can use confidence levels regarding the relationship of the selected song and associated album from different sources and the quality of the album art from the different sources, to substitute album artwork for the song from a source different than the source of the selected song.

With a file transferred to a mobile device, according to the set of rules for transferal, as a string of bytes 1 to n, the information, whether the album artwork for the song or an indication of the absence of the album artwork, can be located from bytes i to j. Extractor 510 can remove the information and insert the album artwork in location i to j. If the insert album artwork requires a number of bytes that does not match the number of bytes from location i to j, information regarding the change in byte size can be provided in header information of the file transfer to the mobile device. Rather than perform a remove operation, extractor 510 can write bytes 1 to (i−1) sent to buffer 505 into output buffer 515, write the bytes being injected into the file into output buffer 515 starting at byte i following byte (i−1), and write the bytes (j+1) to n sent to buffer 505 in the file in output buffer 515 following the injected data. In addition to injecting the album artwork, other metadata regarding the album artwork such as source or sources associated with the album artwork, confidence levels regarding these sources, and artifacts generated from the album artwork may be injected. The injection and composition of the output stream may be the result of any number of addition, exclusion, and replacement operations, all defined in the stream builder.

Buffer 505 and output buffer 515 may be structured with sufficient size to accommodate the injection process. Buffer 505 and output buffer 515 may be arranged as variable size buffers to contain additional bytes of data generated in the metadata injection process. The additional information may include the start and end location in the file string of the injected information or the start location in the file string of the injected information and the length of the injected data, and the size of the modified file. A fidelity level may be injected as metadata as the file is being transferred that provides information regarding the media file, such as a song being transferred, which may include, but is not limited to, whether the media file is a sample of the media art and not a complete copy of the media art and other information regarding the quality of the media art. The use of the sample may allow the user to decide whether or not the complete media art should be transferred. This sample process allows for evaluation without using large amounts of capacity on the communication medium for transferal that may provide for sampling of a number of media art such as a large number of songs. This sample process allows for evaluation to determine whether or not a greater set of media art, such as a collection of songs or collection of movies, should be acquired. Acquisition may be through purchase of the selected media art via an on-line store or purchase of a machine readable medium such as a CD, DVD, or other such format for media art.

Transcoding is conversion of a media format to another media format such as a digital-to-digital conversion from one format to another format. It typically may include decoding/decompressing original data to an intermediate format followed by re-encoding the intermediate format into a target format. Transcoding may include a process to change assembled code to function on a different platform or operating system. Transcoding provides a process of converting a media file or object from one format to another. For example, transcoding may be used to convert among video formats such as Beta, VHS (Video Home System), QuickTime, Video for Windows, MPEG (Moving Picture Experts Group), and other video formats. Transcoding may be used to convert among audio formats such as wav (Waveform audio format), au (Audio file format), mp3 (MPEG-1 Audio Layer 3), wma (Windows Media Audio), aiff (Audio Interchange File Format), and other audio formats. Transcoding may be used to convert among multimedia container formats such as mp4, QuickTime, or other similar format, which are commonly used to store digital audio streams, digital video streams, and related data. Other media conversions may include text and graphic files for use in mobile devices that may have small screen sizes, low memory, and low bandwidth rates. Transcoding may provide the encoding of files to a lower bit rate without changing media formats, a process that is also known as transrating. Transcoding provides a mechanism for the PC to provide a format to a specific mobile device, according to the formats that the specific mobile device is configured to support. Transcoding may be an optional procedure, since some media content may be provided without transcoding.

In various embodiments, an application on an apparatus, similar to the stream builder of FIG. 5, can be realized to provide metadata injection as one or more media files are being transferred to a mobile device. The application may be arranged to acquire streams of information from multiple sources and generate a file including a composition of the streams that are placed in an order that can be read on another apparatus. The order of the composition of data streams may be defined under one or more rule sets stored or determinable by both apparatus.

The length and locations of the various streams of the composition may be provided to the receiving apparatus using various mechanisms. The length and location information may be provided in a header as part of the file containing the composition of streams, where the rules regarding the header information may be stored in each apparatus. The length and location information may be provided in a separate file. The length and location information may be provided by the file format containing the composition of streams including a section of the file that includes a dictionary that defines the manner in which to read the file.

Metadata injection during transfer of foes may be used in various apparatus. A PC may provide metadata injection in the transferal of media files to mobile devices such as mobile wireless devices. The PC may include instrumentality to operate as a wireless server with a mobile wireless communication device. A mobile device may provide metadata injection in the transferal of media files or metadata files related to a given set of media files to a personal computer, to mobile devices through the PC, and/or directly to the other mobile devices. Such a mobile device may be realized as a mobile wireless communication device. The various transferals may be conducted using a direct wired link such as provided by a USB connection or other such link, a Wi-Fi network or other such link, a large area wireless network, and other communication paths.

In various embodiments, metadata injection may be used to map metadata associated with one of more media libraries on a PC to a mobile device. The mobile device may be mobile wireless communication device. The PC can be configured to include a wireless server. The PC may include a media sync engine and K media libraries, where each of the media libraries have $N_i$ collections of media files. The media sync engine may include M collections of data and artifacts related to the $N_i$ collections of the K media libraries that media engine can sync to a mobile device. The media engine may be limited in the amount of data that can be synced to the mobile device based on various criteria that include the nature of the media files. Certain media files may be restricted from playing on devices other than the PC on which the media files were acquired. In addition, based on various criteria, P collections of media files are selected for download to the mobile device. The selection of the P collections may depend on media file size, capacity of available transport, settings of the mobile device, user preferences, and use restrictions on activities of the identified user registered to the mobile device. The identity of the registered user of the mobile device may be determined on the establishment of a communication link between the PC and the mobile device. Alternatively, in various embodiments, metadata injection may be used to map metadata associated with one of more media libraries on a PC directly from the media libraries to the mobile device. In various embodiments, the media libraries may be external to the PC.

In various embodiments, a media metadata file is transferred from a PC to a wireless communication device that is associated in some manner with the Pc. The media metadata file being transferred from the PC to the wireless communication device may be a media library file identifying media files on the Pc. In an embodiment, once transferred, the wireless communication device has the same media library file as the PC except that the media library file on the wireless communication device may include additional information in the form of metadata that is generated as an artifact of the transfer of the medial library file from the PC to the wireless communication device. The injection of the artifact may be viewed as stamp coding the metadata file to dynamically modify the metadata such that what is placed on the device is a different from what was on the PC. The stamp coding of metadata can include an identification of the PC as the source of the transferred media metadata file.

In various embodiments, a VI for managing media foes on the device and pending transfers is provided. The VI may include graphical indicators for status (e.g., on device, on PC, etc.) and/or actions (e.g., download, purchase, preview, email, play remotely). Some example VI screens from a device are provided in FIGS. 6-11.

The embodiments shown in FIGS. 1-5 may be implemented as a desktop application to synchronize media content with a mobile wireless communications device. The embodiments shown in FIGS. 1-5 may also allow a user to use a mobile wireless communications device to browse and synchronize a library on a PC with a library on the mobile wireless communications device.

In various embodiments, device configurations and operational methods are provided for a user of a mobile wireless communications device to remotely view and/or manage their music home music libraries directly from their mobile wireless communications device with the ability to synchronize/ transfer music through wired connectivity and/or wirelessly and justifies them within their context of use. Such transfer may be realized in a personal computer (PC). Such transfer may be realized in a wireless server in which the user and/or the mobile wireless communications device are registered as being allowed to enter into such transfers. The wireless server may be configured in a personal computer. The mobile wireless communications device may be a handheld device such as a cell phone-type device. The mobile wireless communications device may be a portable computer such as a lap-top computer. Such configurations and operating structures provide a straight-forward user friendly way, both in a user's mobile wireless communications device and in a personal computer of the user, for managing multimedia files, audio files, video files, and/or combinations thereof, belonging to a user or which the user is allowed to access.

In various embodiments, transfer/sync of multimedia files, audio files, video files, and/or combinations thereof between a computer (and associated media managers of the computer) and a mobile wireless communications device may be accomplished using a number of mechanisms. The transfer/sync between the mobile wireless communications device and the wireless server maybe accomplished through a USB connection. The transfer/sync between the mobile wireless communications device and the wireless server may be accomplished through a Wi-Fi communication session. The transfer/sync between the mobile wireless communications device and the wireless server may be accomplished over wide area network (WAN) such as a wireless network.

In various embodiments, a mobile wireless communications device is configured with hardware, software, and combinations thereof to view offline, from its associated PC or associated wireless server and offline from the Internet, a library or libraries that may include multimedia files, audio files, video files, photos, videos, podcasts, and/or combinations thereof in the mobile wireless communications device. Such libraries may include libraries of iTunes®, Windows Media Player®, other music libraries, video libraries, and other multimedia libraries. The mobile wireless communications device may include executable instructions allowing its user to view, edit, delete, and schedule multimedia, music, video, and/or combinations for sync between the mobile wireless communications device and its associated personal computer or wireless server. All changes/requests/transfers may occur automatically upon establishment of one of more of USB, Wi-Fi, or WAN connections to the associated personal computer or wireless server. In various embodiments, the personal computer may be configured with appropriate instrumentalities to operate as a wireless server. The hardware and software of the mobile wireless communications device may include a multimedia sync application having a remote management tool to manage a user's libraries of the user's PC, such as but not limited to music from the user's iTunes® or Windows Media Player® (WMP), directly from the mobile wireless communications device. Various embodiments provide functions to manage, play, and sync multimedia presentations, video, and/or music that bridge the gap between PC sync and remote access to realize media management from a handheld wireless device rather than limiting such management to a desktop.

In various embodiments, mobile wireless communications devices are configured to allow offline access to a user's entire PC music library and to allow a 2-way sync, including wireless, between the mobile wireless communications device and the target media manager on a user's PC. For example, a mobile wireless communications device may be configured to schedule downloads and syncs of media avoiding limitations associated with streaming the media content directly to the handset. The mobile wireless communications device may be configured with a remote management application and a wireless sync application, where each has access (an optimized copy) of the user's media library directly from the mobile wireless communications device. Access to this library may not require a network connection to an associated PC or a server on the Internet. The library may be arranged as a multimedia library, a music library, a video library, or a combination thereof. In an embodiment, an optimized version of a user's music library may be contained on the user's mobile wireless communications device allowing for offline viewing and management such that only the optimized music library file (i.e. an "index") is present on the user's mobile wireless communications device, not the actual songs themselves. Any edits or requests for download/sync will sync with the user's associated PC upon connection via USB, WAN, or WLAN (wireless local area network). New media content, such as new music content, that have been requested for download may be contained in a download "manager"/queue and may be sent to the user's device upon the next USB or Wi-Fi connection. The download may be sent on the next connection in a wireless network to which the computer is coupled. In an embodiment, should the user choose, they can force transfer/download of any item in the pending download queue over a cellular network.

In various embodiments, a mobile wireless communications device may be configured with hardware and software that provide: simple ease of use for the user, integration between the mobile wireless communications device and a desktop manager and/or a media sync application of a wireless server configured in a personal computer, support of USB sync, WLAN sync, WAN sync, or sync using combinations thereof between a user's PC and their mobile wireless communications device, integration with different media players such as but not limited to iTunes® and Windows Media Player®, ability for a user to view their media libraries directly from the mobile wireless communications device without a network connection for viewing via a small/optimized copy of the libraries, ability to view library content by album, artist, genre, playlists, ability to add music, such as but not limited to individual songs, albums, artists, playlists to a download manager/queue, ability to transfer/synchronize media in the download queue with the user's mobile wireless communications device upon next USB or Wi-Fi connection to their associated PC or associated PCs, and a 2-way sync with media libraries on the users home PC. A 2-way allows for activity on a mobile wireless communications device to be conducted in a manner similar to the activity of the PC. For example, if a user deletes music or creates/edits a playlist from their mobile wireless communications device, the data can be transmitted wired and/or wirelessly, and these changes reflected in the media libraries on the user's associated PC, which may include iTunes® and WMP among others. Further, if a user deletes music or creates/edits a playlist from their associated PC via one or more libraries on the PC, the data can be transmitted wired and/or wirelessly, and these changes reflected on the mobile wireless communications device. For example, new media content that have been requested for download may be contained in a download manager/queue and may be sent to the user's mobile wireless communications device upon the next USB, Wi-Fi, or wireless network connection. Should the user choose they can force transfer/download any item in the pending download queue over a cellular network.

In various embodiments, a mobile wireless communications device may be configured to operate with any operating system that may be used in a cellular device. The mobile wireless communications device may be configured with access to media functions with external controls to virtually provide for unlimited storage for a user's media, with independence from the PC desktop to manage all user media needs directly from their portable wireless device, with an open marketplace to discover/acquire music directly from a portable wireless device, with automatic updates/sync of activity conducted on a portable wireless device, with ability to play music on a portable wireless device with other devices such as a car, a home stereo, or other such device, with remote access from the user's mobile wireless communications device to access to their PC library of music and other media.

Figure 6:
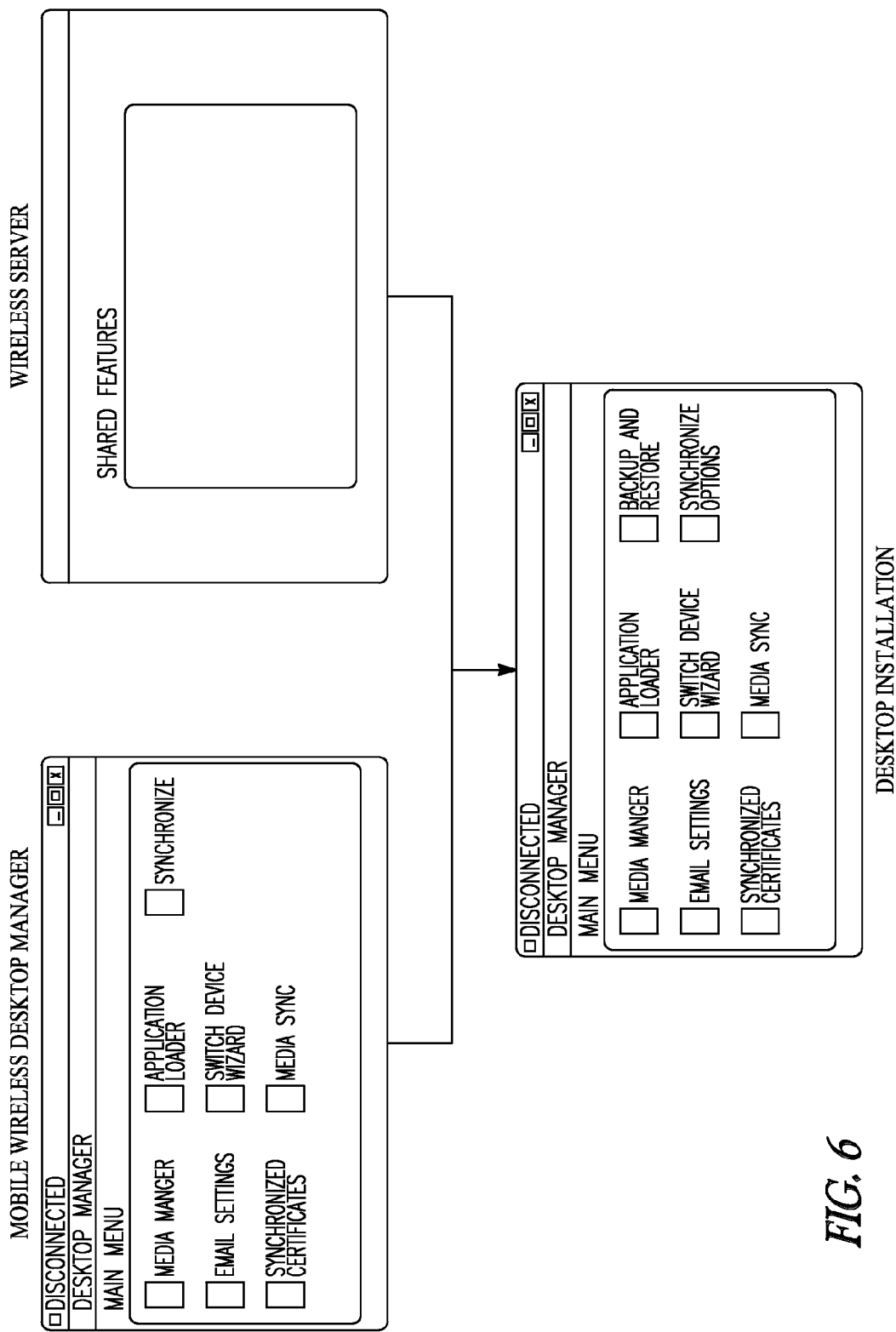
FIG. 6 illustrates an embodiment of a media wireless sync feature installed on a PC with installation of an associated wireless server, according to various embodiments.

In various embodiments, a media wireless sync feature may be installed on a PC with installation of an associated wireless server, as illustrated in FIG. 6. The installation may be realized using a USB connection, The installation may be realized initiated using a USB connection and completed over an Internet connection. The installation may be realized using a Wi-Fi connection. The installation may be initiated using a Wi-Fi connection and completed over an Internet connection. After completion of the installation of the media wireless sync feature, a message indicating that the media wireless features/functionality are enabled may be provided to the user via the mobile wireless communications device, the PC, and/or both.

The media sync application of the mobile wireless communications device may support multiple mobile wireless communications device/users within a home, based on a registration, for example based on a personal identification (PIN). The libraries and the sync to these libraries may be partitioned among the various users of the PC. For example, one person may choose to sync music with one library such as iTunes®, another person may choose to sync with another library such as Windows Media Player®, and a third person may choose to sync with both libraries. The user interface of the wireless server on the PC may allow for dynamic selection of supported media managers as well as remember the last media manager (store the identity of the last media manager or last several media managers) to which a specific mobile wireless communications device synchronized with it and to remember preferences associated with the synchronization. In an embodiment, a file may be specified not to be transferred to the mobile wireless communications device, unless the file is supported by the mobile wireless communications device. Users may be made aware of this through a graphic user interface, if a specific file or file type has been identified as not being selectable for sync. For example, music files that are not to be synced may be shown using an icon or other indicator of a lock condition, when a user is viewing their music library from the mobile wireless communications device.

Figure 7:
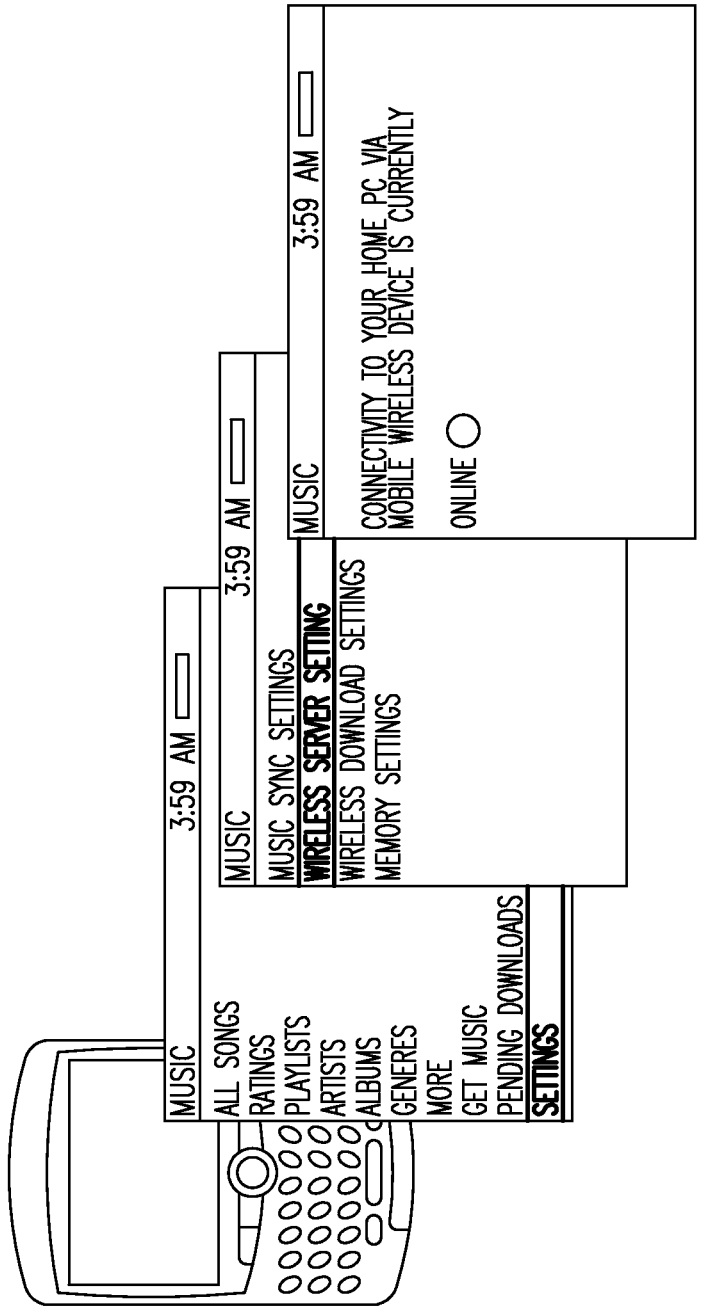
FIG. 7 illustrates an embodiment of a non-limiting example of a user interface showing connectivity, according to various embodiments.

From the user's mobile wireless communications device, the user may observe the status of connectivity to their home PC via a wireless server on the home PC. This view can enable the user to determine if they are able to sync and/or download content via Wi-Fi, WAN, or other connection. FIG. 7 illustrates a non-limiting example of a user interface showing connectivity. A media sync application provides a user with an ability to view (offline) either a media library directly from a mobile wireless communications device allowing them to view, edit, delete, and schedule music for sync. All changes/requests/music transfers can occur upon a USB, Wi-Fi, or WAN connection to their home PC. With a wireless server on a home PC offline, an error message may be generated to indicate the status of the wireless server when attempting to force a transfer or download via a network connection.

An optimized version of a user's music library contained by a library in the user's PC may be contained on the user's device allowing for offline viewing and management. The optimized media library file may be arranged as an index on the user's mobile wireless communications device. Media filed in the mobile wireless communications device may be stored in the mobile wireless communications device separate from the optimized media library file. During setup (and at any time) of the desktop media sync application, users can select which media manager or managers that they would like configured for remote management and wireless sync.

From a user's mobile wireless communications device, a user may be able to enter the total music library or individual libraries and sort by all songs (name), artist, album, and music genre. The user may also be able to view by all playlists, standard and smart (automatic) as well as those contained in folders. When viewing a playlist from the mobile wireless communications device, users also may be able to view/sort by all songs (name), artist, album, and music genre. Viewing and sorting is not limited to music but may be applied to photos, video, and other multimedia presentations. With the optimized music library file as an index present on the users mobile wireless communications device, and not all the actual songs themselves contained within the library, the optimized library may be sufficiently small allowing the library to be stored on the internal memory of the user's mobile wireless communications device. In various embodiments, swapping memory cards does not disable remote management.

In various embodiments, the optimized media library file on the user's mobile wireless communications device may be refreshed and kept in sync with the media libraries on the user's PC. This sync may provide automatic updating so that the most up to date view of the media library accessible to the PC is available to the user from their mobile wireless communications device. An updated/synchronized copy of the media library may be transferred to the user's mobile wireless communications device upon the next USB/WLAN/WAN connection to the desktop music sync application.

Figure 8:
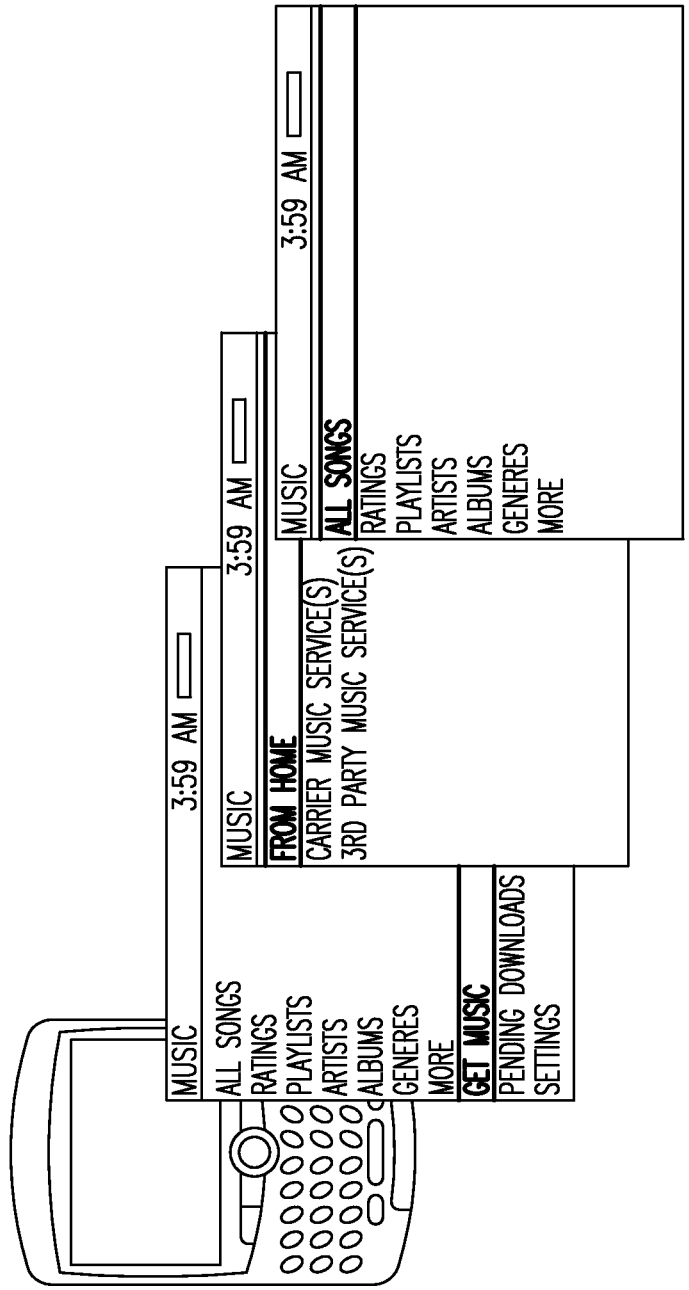
FIG. 8 illustrates an embodiment of an example of a user interface when accessing a home music library, according to various embodiments.

FIG. 8 shows an example of a user interface when accessing a home music library. The user interface is not limited to a home music library but may be libraries of other multimedia presentations. As shown, the user interface provides access and management of a user's music library, for example a user's iTunes® or WMP music library, that is easy to use, intuitive, and be structured in such a way that it allows users to easily view their music libraries directly from the music application on the mobile wireless communications device.

Figure 9:
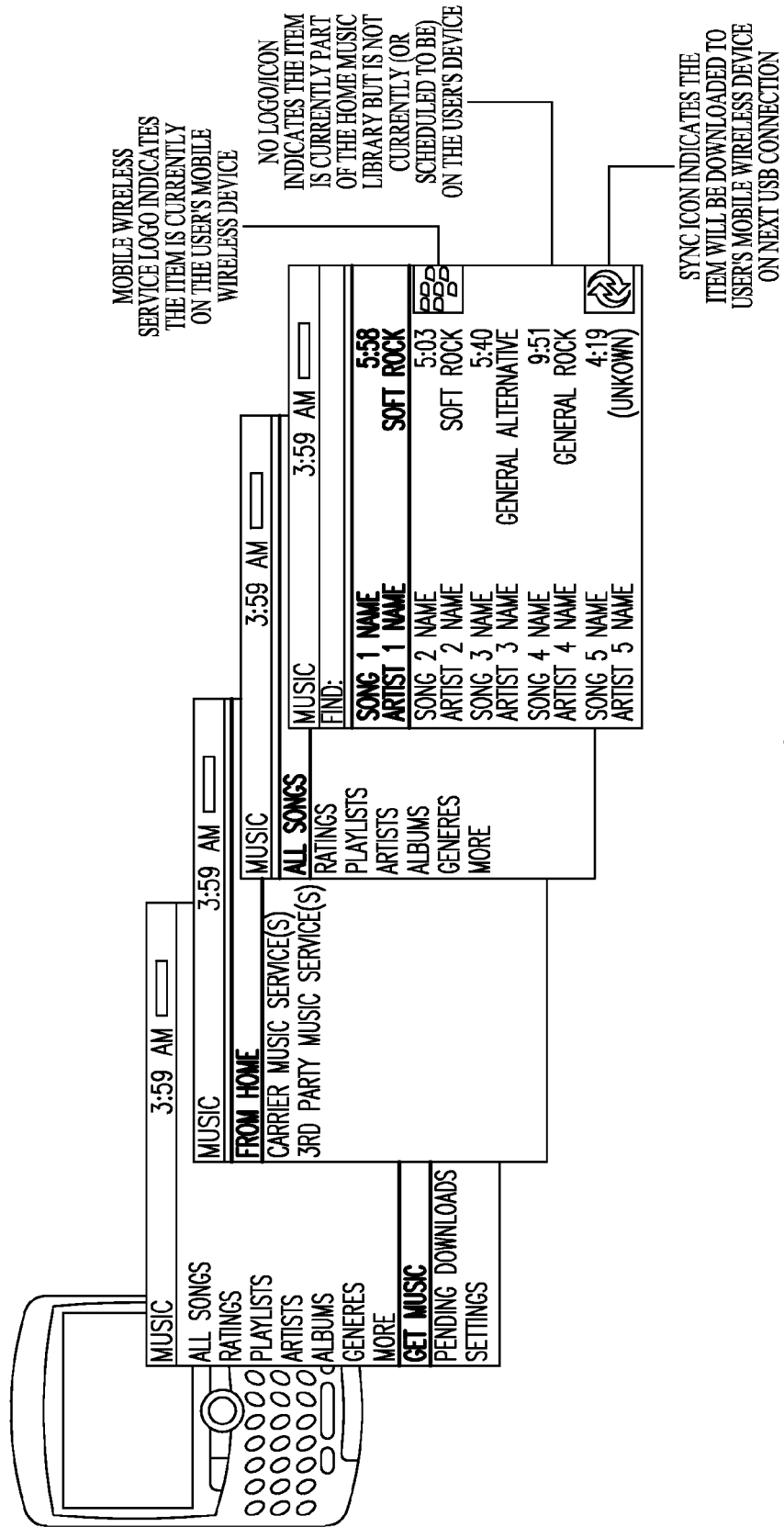
FIG. 9 illustrates an embodiment of an example of viewing a media library, according to various embodiments.

In viewing their home media library from the mobile wireless communications device, the view may be provided in a manner that is similar to how the media library is displayed on the local PC, FIG. 9 illustrates an example of viewing a media library that is easy to use, intuitive, and structured in such a way that it allows users to easily view their media library directly from the media application on the mobile wireless communications device. The view may also provide a view of media that is on their mobile wireless communications device vs. what is not on the mobile wireless communications device with respect to what is in the home libraries. The view may also provide a view of media that has been added to the media download manager as pending downloads that will be transferred/synchronized with their device upon the next USB sync, WLAN sync, or WAN sync with the mobile wireless communications device. The user may also be provided with an indication of the total amount of memory corresponding to media on their mobile wireless communications device including free/available memory, media at an associated PC such as a home PC, and media in the download manager pending download. The media may be further presented in various categories such as music, video, and other multimedia presentations.

In various embodiments, when a user views their home music library, it may be similar to how they view the media local to their mobile wireless communications device to edit the home media library. Users may be able to edit their home music library from a remote management application with a wireless sync feature allowing them to delete media, such as music, on a selected basis and/or edit playlists. For example, the selected basis allows for editing music based on individual songs, albums, artists, genres, or playlists. For example, using edit playlists as a basis allows for adding and/or removing songs contained in one or more playlists. These edits may sync with the users PC and the corresponding media manger library or libraries upon the next USB/WLAN/WAN connection to the desktop media sync application on their home PC. Delete actions may be accompanied by a prompt inquiring as to whether or not the user would like to delete the item from the specified library on the mobile wireless communications device only (keep file on computer) or from the specified library on the associated computer as well.

Figure 10:
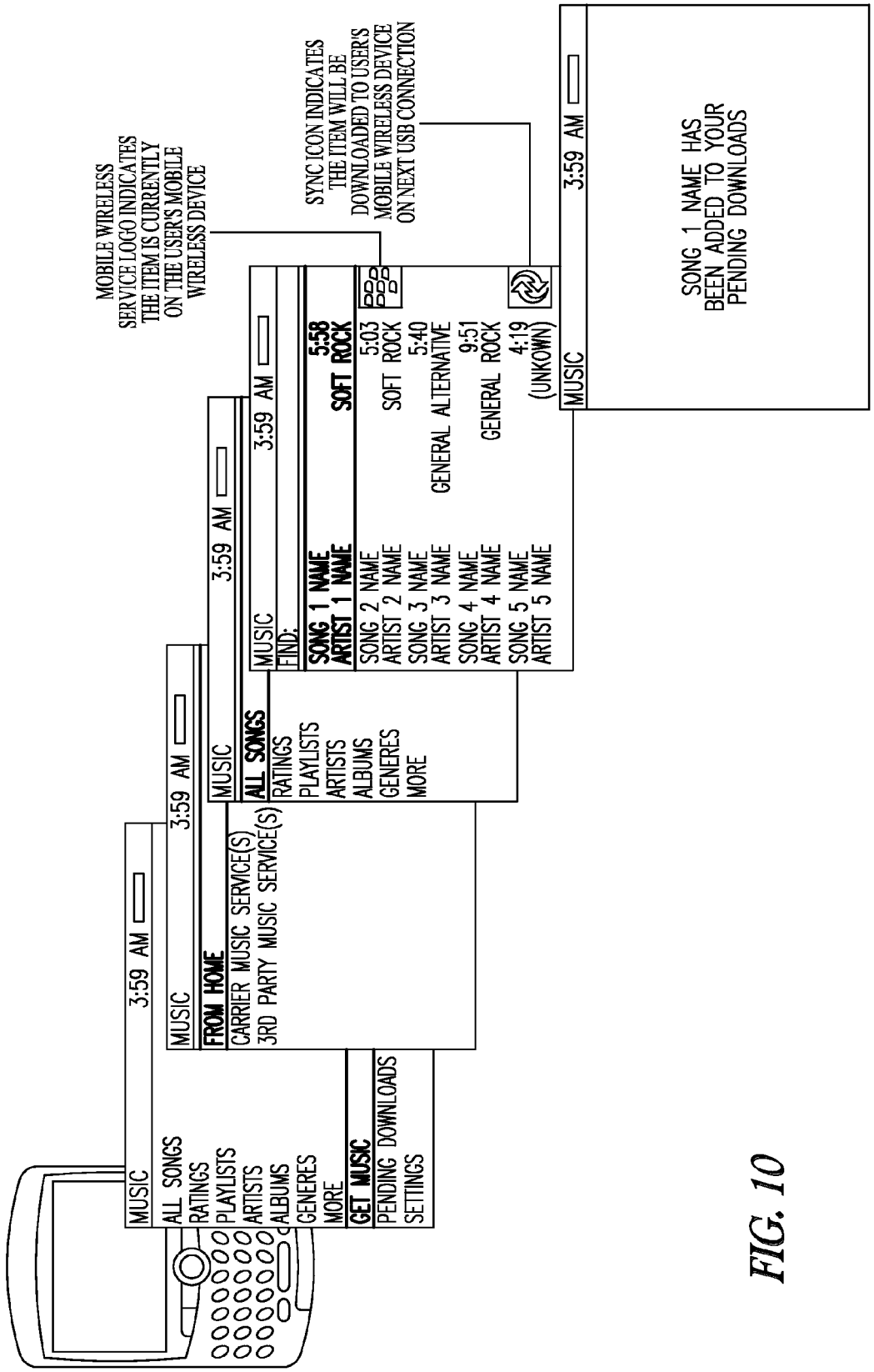
FIG. 10 shows an embodiment of an example of a user interface with respect to adding music to the download manager, according to various embodiments.

FIG. 10 shows an example of a user interface with respect to adding music to the download manager. While viewing a user's home music library, the user may add the following to a download music manager as pending downloads: individual songs, individual albums, individual artists (all songs by an individual artist), individual genres (all songs contained in a single genre), entire playlists, and other categories for arranging music. Additions are not limited to music, but apply to other multimedia presentations. As an example, this addition feature can be shown as a menu item called "sync with mobile wireless communications device" or "add to downloads" when any of the above categories is highlighted. This may be similar to how adding items local to a mobile wireless communications device is handled with respect to playlists local to the mobile wireless communications device. Users may be able to view all items that are currently "pending sync/download." A remote media access implementation may notify a user if they are attempting to schedule/sync content whose total is larger than the device's available/free memory (external plus internal). The user may be notified/prompted on their device of the total content they are attempting to sync (i.e. what is in the media download manager or "pending downloads" queue) and the available space on the mobile wireless communications device and be instructed to remove content from the sync list or device.

Figure 11:
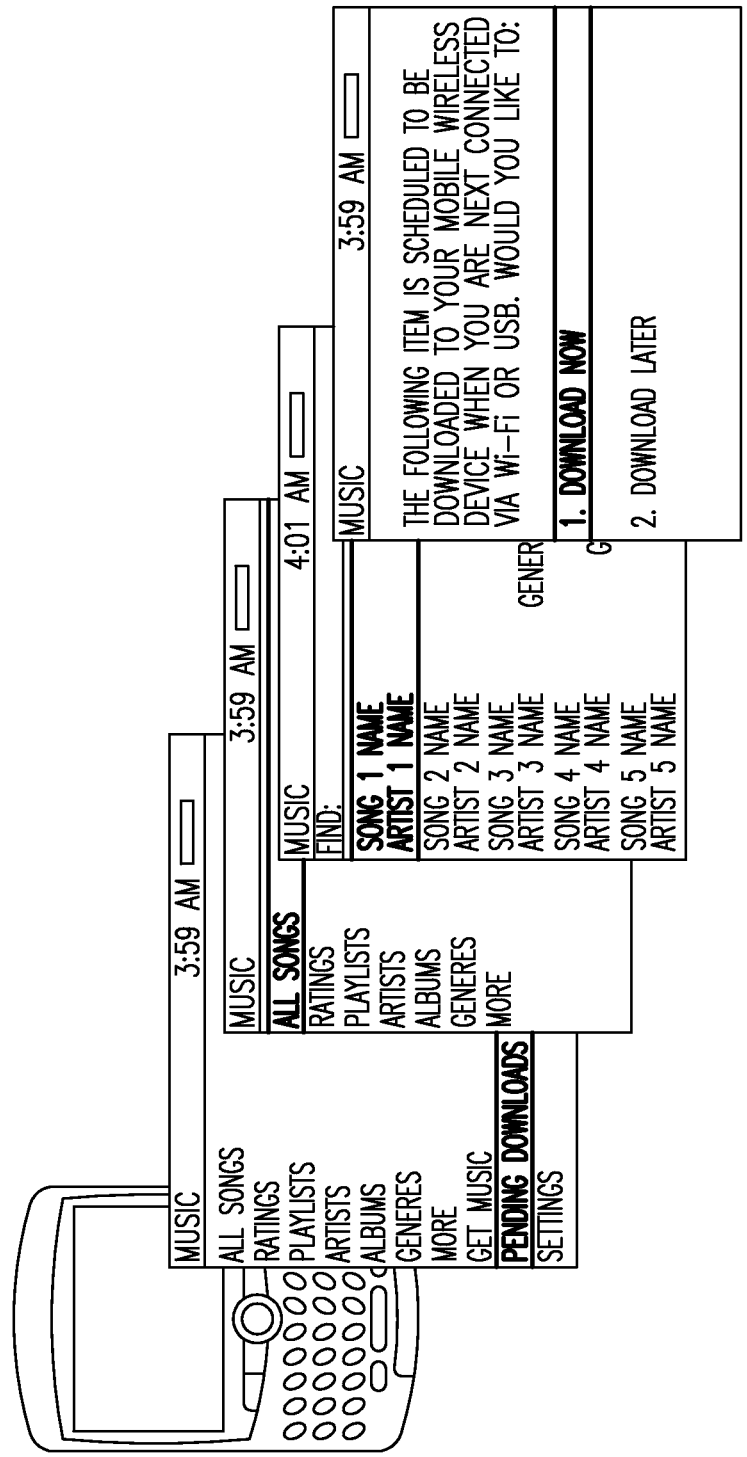
FIG. 11 shows an embodiment of an example of a user interface for viewing a download manager, according to various embodiments.

FIG. 11 shows an example of a user interface for viewing a download manager. This view provides users with the ability to view the media download manager for pending downloads directly from the media home screen of the mobile wireless communications device media player. For example, music that has been requested for download (added to the pending downloads/queue) can be delivered to the mobile wireless communications device upon the next USB, Wi-Fi, or WAN connection. Viewing the items in the pending downloads list may be similar to viewing music on a users mobile wireless communications device and can be sortable (with totals next to each in brackets) by all songs, album, artist, genre, playlists, and other categories.

A user may be provided with a view that indicates in a straight forward manner the total amount of memory corresponding to individual items in the download manager and to total items in the download manager. The following options may be available to the user when viewing the contents of the download manager: (1) delete (i.e. remove items from the download manager), which may include an item no longer being requested for transfer/sync with the device, and (2) download now, which allows for manual force transfer of media via a WAN. Users may be prompted that this may result in cellular data charges as per their existing mobile wireless communications device data plan. Other options may be provided.

Figure 12:
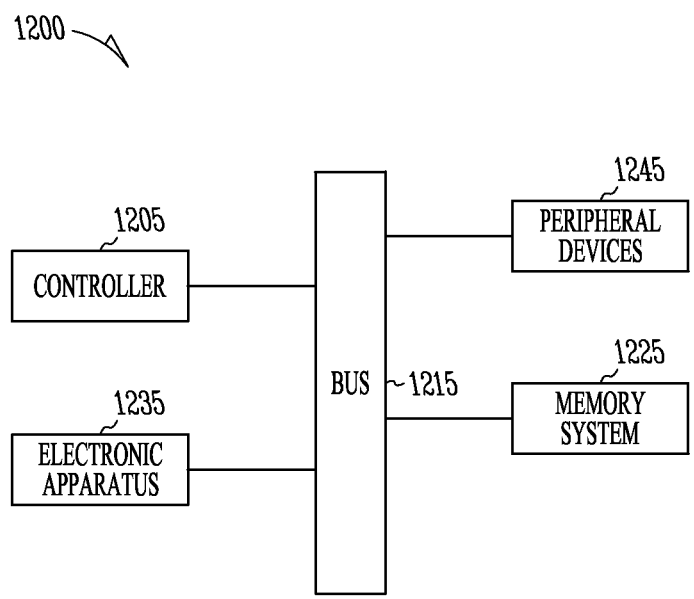
FIG. 12 depicts a diagram of an embodiment of a system having a controller and a memory system, according to various embodiments.

FIG. 12 depicts a diagram of an embodiment of a system 1200 having a controller 1205 and a memory system 1225. System 1200 also includes electronic apparatus 1235 and a bus 1215, where bus 1215 provides electrical conductivity among the components of system 1200. In an embodiment, bus 1215 includes an address bus, a data bus, and a control bus, each independently configured. In an alternative embodiment, bus 1215 uses common conductive lines for providing one or more of address, data, or control, the use of which is regulated by controller 1205. Bus 1215 may be realized as multiple busses. In an embodiment, electronic apparatus 1235 is additional memory system configured in a manner similar to memory system 1225. In an embodiment, additional peripheral device or devices 1245 are coupled to bus 1215. In an embodiment, peripheral devices 1245 include displays, additional storage memory system, and/or other control devices that may operate in conjunction with controller 1205 and/or memory system 1225. In an embodiment, controller 1205 is a processor.

Controller 1205 and memory system 1225 can be arranged to manage media content and associated information on system 1200. In an embodiment, system 1200 is arranged as a PC. The PC may include instrumentality distributed throughout the PC to operate as a wireless server. System 1200 arranged as a PC can operate according to any of the various embodiments discussed herein to manage media content and associated information within the PC and/or in conjunction with one or more mobile devices such as mobile wireless communications devices.

In an embodiment, system 1200 is arranged as a mobile device. The mobile device may be a mobile wireless communications device. System 1200 arranged as a mobile device can operate according to any of the various embodiments discussed herein to manage media content and associated information within the mobile device, and/or in conjunction with a PC or other apparatus having software and/or hardware to manage media content.

Various embodiments or combination of embodiments for apparatus and methods for a system, such as a PC, to manage media content, as described herein, can be realized in hardware implementations, software implementations, and combinations of hardware and software implementations. These implementations may include a machine-readable medium having machine-executable instructions, such as a computer-readable medium having computer-executable instructions, for operating the system in a relationship with one or more mobile devices such that media content and associated information is managed between the system and the mobile device. The communications of the system with a mobile wireless communications device can be conducted on a secured basis. The machine-readable medium is not limited to any one type of medium.

Various embodiments or combination of embodiments for apparatus and methods for a mobile device, such as a mobile wireless communications device, as described herein, can be realized in hardware implementations, software implementations, and combinations of hardware and software implementations. These implementations may include a machine-readable medium having machine-executable instructions, such as a computer-readable medium having computer-executable instructions, for operating the mobile device to manage its media content and associated information within the mobile device, in conjunction with a system, such as a PC, and/or with respect to other mobile devices. The communications between a mobile wireless communications device and the system can be conducted on a secured basis. The machine-readable medium is not limited to any one type of medium.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A wireless server comprising:
at least one processor;
a metadata storage configured to store metadata files associated with media files;
a buffer configured to acquire from the metadata storage metadata files associated with one or more files identified for transfer to a wireless device;
an output buffer configured to store modified files to be transferred to the wireless device; and
an extractor configured to modify metadata in the metadata files in the buffer during a synchronization of the wireless device with the wireless server, and to write the modified metadata files into the output buffer, wherein the extractor modifies the metadata in the metadata files by injecting additional data into the metadata files and the injecting additional data includes injecting policy parameters and user settings associated with the one or more media files into the metadata files.

2. The wireless server of claim 1, wherein the extractor is further configured to modify the metadata in the metadata files by injecting album art associated with the one or more media files into the metadata files.

3. The wireless server of claim 1, wherein the extractor is further configured to modify the metadata in the metadata files by injecting artifacts indicative of a source of the transfer into the metadata files.

4. The wireless server of claim 1, wherein the extractor is further configured to modify the metadata in the metadata files by injecting viewing limitations associated with the one or more media files into the metadata files.

5. The wireless server of claim 1, further comprising:
a communication link configured to transfer the modified metadata files in the output buffer together with the one or more media files to the wireless device.

6. The wireless server of claim 1, wherein the extractor is configured to modify the metadata in the metadata files during a transfer of the metadata files from the wireless server to the wireless device.

7. A computer-implemented method of modifying metadata files on a wireless server comprising:
storing metadata files associated with one or more media files identified for transfer to a wireless device in a metadata storage;
outputting the metadata files associated with the one or more media files identified for transfer to the wireless device from the metadata storage to the buffer;
modifying metadata in the metadata files in the buffer during a transfer of the metadata files from the wireless server to the wireless device by injecting additional data into the metadata files, wherein the injecting additional data into the metadata files includes injecting policy parameters and user settings associated with the one or more media files into the metadata files; and
writing the modified metadata files into an output buffer to be transferred to the wireless device.

8. The method of claim 7, further comprising:
transferring the modified metadata files from the output buffer to the wireless device together with the one or more media files.

9. The method of claim 7, wherein modifying metadata in the metadata files further includes injecting album art associated with the one or more media files, source or sources associated with the album artwork, confidence levels regarding these sources, and artifacts generated from injecting the album artwork.

10. The method of claim 7, wherein modifying metadata in the metadata files further includes injecting artifacts indicative of a source of the transfer.

11. The method of claim 7, wherein modifying metadata in the metadata files further includes injecting viewing limitations associated with the one or more media files.

12. The method of claim 7, wherein modifying metadata in the metadata files comprises modifying the metadata in the metadata files during a synchronization of the wireless device with the wireless server.

13. A computer-implemented method of modifying metadata files on a wireless server comprising:
storing metadata files associated with one or more media files identified for transfer to a wireless device in a metadata storage;
outputting the metadata files associated with the one or more media files identified for transfer to the wireless device from the metadata storage to the buffer;
modifying metadata in the metadata files in the buffer during a transfer of the metadata files from the wireless server to the wireless device by injecting additional data into the metadata files, wherein modifying metadata in the metadata files further includes injecting album art associated with the one or more media files, source or sources associated with the album artwork, confidence levels regarding these sources, and artifacts generated from injecting the album artwork; and
writing the modified metadata files into an output buffer to be transferred to the wireless device.

* * * * *